(12) United States Patent
Ha et al.

(10) Patent No.: US 7,609,028 B2
(45) Date of Patent: Oct. 27, 2009

(54) SENSING BOARD ASSEMBLY FOR SECONDARY BATTERY MODULE

(75) Inventors: Jin Woong Ha, Cheonan-si (KR); Jeeho Kim, Daejeon (KR); HanHo Lee, Daejeon (KR)

(73) Assignee: LG Chem, Ltd. (KR)

( * ) Notice: Subject to any disclaimer, the term of this patent is extended or adjusted under 35 U.S.C. 154(b) by 670 days.

(21) Appl. No.: 11/317,309

(22) Filed: Dec. 23, 2005

(65) Prior Publication Data

US 2006/0170396 A1 Aug. 3, 2006

(30) Foreign Application Priority Data

Dec. 24, 2004 (KR) .................... 10-2004-0112597

(51) Int. Cl.
*H02J 7/00* (2006.01)
*H01M 2/00* (2006.01)

(52) U.S. Cl. .................... 320/116; 320/107; 429/61; 429/163

(58) Field of Classification Search ............. 320/106, 320/107, 111, 112, 116; 429/61, 62, 92, 429/99, 100, 123, 152, 158
See application file for complete search history.

(56) References Cited

U.S. PATENT DOCUMENTS

| | | | |
|---|---|---|---|
| 5,547,775 A * | 8/1996 | Eguchi et al. ............... 320/118 |
| 6,296,967 B1 * | 10/2001 | Jacobs et al. ................. 429/93 |
| 6,372,377 B1 * | 4/2002 | Ovshinsky et al. ............ 429/66 |
| 6,472,098 B1 * | 10/2002 | Sawada et al. ............. 429/163 |
| 6,837,095 B2 * | 1/2005 | Sunshine et al. ............. 73/23.2 |
| 7,453,235 B2 * | 11/2008 | Blair et al. .................. 320/116 |
| 2003/0027039 A1 * | 2/2003 | Benson et al. .............. 429/158 |
| 2005/0061056 A1 * | 3/2005 | Sunshine et al. ............. 73/23.2 |
| 2007/0087266 A1 * | 4/2007 | Bourke et al. ............... 429/159 |

* cited by examiner

*Primary Examiner*—Edward Tso
*Assistant Examiner*—M'Baye Diao
(74) *Attorney, Agent, or Firm*—Cantor Colburn LLP

(57) ABSTRACT

Disclosed herein is a sensing board assembly mounted in a high-output, large-capacity secondary battery module, which has a plurality of secondary unit cells mounted therein such that the secondary unit cells are electrically connected with each other, for sensing the voltage and current of the unit cells. The sensing board assembly comprises connecting members for electrically connecting electrode terminals of the unit cells with each other, each of the connecting members including a connecting extension part, by which the connecting members are connected to a printed circuit board, and the printed circuit board having drilled-holes, through which the connecting extension parts of the connecting members are securely inserted, and circuits connected to the drilled-holes.

8 Claims, 7 Drawing Sheets

SENSING BOARD ASSEMBLY FOR SECONDARY BATTERY MODULE

FIELD OF THE INVENTION

The present invention relates to a sensing board assembly for secondary battery modules, and, more particularly, to a sensing board assembly mounted in a high-output, large-capacity secondary battery module, which has a plurality of secondary unit cells mounted therein such that the secondary unit cells are electrically connected with each other, for sensing the voltage and current of the unit cells. Also, the present invention relates to a secondary battery module including the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel. As a result, kinds of applications using the secondary battery are being increased owing to advantages of the secondary battery, and hereafter the secondary battery is expected to be applied to more applications and products than now.

As kinds of applications and products, to which the secondary battery is applicable, are increased, kinds of batteries are also increased such that the batteries can provide outputs and capacities corresponding to the various applications and products. Furthermore, there is a strong need to reduce the size and weight of the batteries applied to the corresponding applications and products.

For example, small-sized mobile devices, such as mobile phones, personal digital assistants (PDAs), digital cameras, and laptop computers, use one or several small-sized, light cells for each device according to the reduction in size and weight of the corresponding products. On the other hand, medium- or large-sized devices, such as electric bicycles, electric motorcycles, electric vehicles, and hybrid electric vehicles, use a battery module (or "battery pack") having a plurality of cells electrically connected with each other because high output and large capacity is necessary for the medium- or large-sized devices. The size and weight of the battery module is directly related to the receiving space and output of the corresponding medium- or large-sized device. For this reason, manufacturers are trying to manufacture small-sized, light battery modules.

The conventional medium- or large-sized secondary battery module is constructed in a structure in which a plurality of unit cells are received in a case (housing) having a predetermined size, and the unit cells are electrically connected with each other. At the outside of the case are mounted a plurality of circuit units for sensing the voltage, the current, and the temperature of the unit cells and controlling the operation of the battery.

It is required for the medium- or large-sized secondary battery module to have a different structure from a small-sized battery due to the structural or use characteristics thereof.

The medium- or large-sized secondary battery module uses a plurality of unit cells to provide high output and large capacity. Especially, all or at least some of the unit cells are connected in series with each other to provide high output. Consequently, when some of the unit cells are damaged due to overcharge, overdischarge, overcurrent, overheating thereof, the entirety of the battery module may catch fire or explode through a chain reaction. Also, the malfunction of some unit cells may cause the malfunction of the entirety of the battery module. For this reason, there is used a device for continuously sensing and controlling the voltage and/or the current of each unit cell and the temperature of the whole battery module.

Generally, wires are directly connected to the electrode terminals of the unit cells or connected to electrical connecting members of the electrode terminals such that the voltage and/or the current of the unit cells can be sensed and controlled by a circuit part, such as a battery management system (BMS). Consequently, a large number of wires are necessary to sense the voltage and the current of the unit cells with the result that the assembly process of the battery module is complicated, and the number of defective battery modules is increased.

Generally, rectangular cells or pouch-shaped cells, which can be stacked with high integration, are used as the unit cells of the battery module. Preferably, the pouch-shaped cells are normally used as the unit cells, since the pouch-shaped cells are light and inexpensive. Each pouch-shaped cell includes an electrode assembly, which comprises a cathode, a separation film, and an anode, mounted together with an electrolyte in a sealed pouch-shaped case, which is made of an aluminum laminate sheet. The pouch-shaped cell has a structure in which small plate-shaped electrode terminals are exposed at the outside of the electrode assembly. However, several problems are raised when the small plate-shaped electrode terminals are electrically connected with each other. Generally, the electrode terminals are connected with each other using wires, metal plates, or bus bars by welding, but it is difficult to electrically connect the plate-shaped electrode terminals with each other by welding. In a conventional art, holes necessary to accomplish the electrical connection are drilled in a printed circuit board, the electrode terminals of the unit cells are inserted through the drilled-holes, and then the electrode terminals of the unit cells are attached to the printed circuit board by welding. However, the mechanical strength of the electrode terminals is low. As a result, it is difficult to accurately insert the electrode terminals of the stacked unit cells at predetermined positions, and, at the same time, it is also difficult to insert the electrode terminals of the stacked unit cells through the drilled-holes of the printed circuit board.

Also, the medium- or large-sized secondary battery module is used in various devices, such as electric bicycles, electric vehicles, and industrial equipment. These devices are subject to a large number of large or small external forces. Consequently, it is necessary that the coupling between the components of the battery module be stable. However, the conventional medium- or large-sized secondary battery module cannot perfectly satisfy the above-specified necessary conditions.

SUMMARY OF THE INVENTION

Accordingly, it is an object of the present invention to substantially obviate the above-mentioned problems of the conventional arts as well as the technical problems requested from the past.

Specifically, a primary object of the present invention is to provide a sensing board assembly that is capable of sensing the voltage and the current of unit cells.

Another object of the present invention is to provide a sensing board assembly that can be used to manufacture a compact battery module.

Another object of the present invention is to provide a sensing board assembly having a high coupling force at electrically connected regions, thereby allowing an easy assembly process to be performed with high reliability.

Yet another object of the present invention is to provide a secondary battery module including the sensing board assembly as described above.

In accordance with one aspect of the present invention, the above and other objects can be accomplished by the provision of a sensing board assembly mounted in a high-output, large-capacity battery module, which has a plurality of secondary unit cells mounted therein, for sensing the voltage, the current and/or the temperature of the unit cells, wherein the sensing board assembly comprises: connecting members for electrically connecting electrode terminals of the unit cells with each other, each of the connecting members including a connecting extension part, by which the connecting members are connected to a printed circuit board; and the printed circuit board having drilled-holes, through which the connecting extension parts of the connecting members are securely inserted, and circuits are connected to the drilled-holes.

Using the sensing board assembly according to the present invention, the respective electrode terminals of the unit cells constituting the battery module are electrically connected with each other by the connecting members, the printed circuit board is mounted on the connecting members such that the connecting extension parts of the connecting members are inserted through the drilled-holes. Consequently, it is possible to easily manufacture a battery module that is capable of allowing the voltage and current of unit cells to be measured.

The connecting extension parts of the connecting members may be securely inserted through the drilled-holes of the printed circuit board in various manners. Preferably, the connecting extension parts of the connecting members have a length sufficient to protrude outward from the printed circuit board after the connecting extension parts are inserted through the drilled-holes, and the protruding tips of the connecting extension parts are coupled to the printed circuit board by soldering, whereby the secure electrical connection and the secure mechanical coupling are accomplished.

The connecting members are not particularly restricted so long as the respective electrode terminals of the unit cells can be connected in series or in parallel with each other. The connecting members are made of a conductive material. In a preferred embodiment of the present invention, the connecting members are made of a metal plate, and the connecting extension parts protrude from the metal plate toward the printed circuit board.

Preferably, the sensing board assembly further comprises insulating members mounted between the electrode terminals of the neighboring unit cells for accomplishing the electrical insulation between the electrode terminals, the insulating members being coupled to the electrode terminals, and the electrical connection between the electrode terminals of the unit cells is accomplished by the connecting members while the connecting members are coupled to the corresponding insulating members. Using the insulating members, it is possible to easily stack the unit cells one on another while the unit cells are electrically insulated from each other, and it is possible to easily locate the connecting members, which are used to electrically connect the electrode terminals with each other.

The insulating members may be coupled with the electrode terminals of the unit cells in various manners. In a preferred embodiment of the present invention, the electrode terminals of the unit cells are provided with though-holes, and each insulating member is provided with coupling protrusions, which correspond to the through-holes. Consequently, the coupling protrusions of the insulating members are fitted in the though-holes of the electrode terminals, and therefore, the secure coupling between the insulating members and the electrode terminals is accomplished. Preferably, the coupling protrusions are also provided with through-holes, such that the electrode terminals stacked while the insulating members are disposed between the electrode terminals, are further securely coupled with each other by coupling members inserted through the through-holes of the coupling protrusions.

In a preferred embodiment of the present invention, each of the insulating members is constructed in the shape of a rectangular block, which conforms to a gap between the electrode terminals of the stacked unit cells. The gap between the electrode terminals, while the unit cells are stacked, is provided in the shape of a rectangle. Consequently, the rectangular block conforming to the gap is more stable.

More preferably, the block comprises two assembly unit bodies constructed such that the assembly unit bodies can be coupled with or separated from each other, a cathode terminal of the unit cell being coupled to one of the assembly unit bodies while an anode terminal of the unit cell is coupled to the other assembly unit body.

The coupling between the connecting members and the corresponding insulating members may be accomplished in various manners. In a preferred embodiment of the present invention, each of the connecting members comprises: a first terminal connecting body connected to an electrode terminal (a) of one unit cell (A); and a second terminal connecting body connected to an electrode terminal (b) of another unit cell (B) adjacent to the unit cell (A). The connecting members may be coupled to the corresponding insulating members in such a manner that the connecting members surround the corresponding insulating members, or the connecting members may be inserted into engaging grooves formed at the insulating members. When the electrode terminal (a) of the unit cell (A) connected to the corresponding connecting member is different from the electrode terminal (b) of the unit cell (B) connected to the corresponding connecting member, the electrode terminals are connected in series with each other. When the electrode terminal (a) of the unit cell (A) connected to the corresponding connecting member is identical to the electrode terminal (b) of the unit cell (B) connected to the corresponding connecting member, on the other hand, the electrode terminals are connected in parallel with each other.

More preferably, the first terminal connecting body and the second terminal connecting body are separated from each other, the first terminal connecting body and the second terminal connecting body are coupled to the corresponding insulating member such that the first and second terminal connecting bodies are connected to the corresponding electrode terminals, and the first terminal connecting body and the second terminal connecting body are connected with each other by a conductive member for accomplishing the electrical connection between the first terminal connecting body and the second terminal connecting body after the first and second terminal connecting bodies are coupled to the corresponding insulating member. Preferably, the conductive member is a safety element, such as a fuse, a bimetal, or a positive temperature coefficient (PTC) element.

When the above-described separation-type connecting members are used during the assembly of the battery module, a possibility of short circuits is greatly reduced, since the electrodes are not electrically connected with each other by the connecting members. Furthermore, the safety element can be connected as described above, and it is possible to perform a parallel leveling process for leveling the initial state of the unit cells.

As described above, the printed circuit board, which is another component of the sensing board assembly according to the present invention, includes the plurality of drilled-holes, through which the connecting extension parts of the connecting members are securely inserted. The drilled-holes are electrically connected with each other by circuits printed on a board body of the printed circuit board. The printed circuit board is usually made of an epoxy resin composite, although the material for the printed circuit board is not particularly restricted.

The circuits printed on the printed circuit board are connected to a circuit for sensing the voltage, the current, and the temperature of the battery to control the operation of the battery module. The control circuit may be included in the printed circuit board or an additional member.

According to the present invention, the connecting extension parts of the connecting members, which have a higher strength than the electrode terminals of the unit cells, are connected to the printed circuit board of the sensing board assembly according to the present invention. Consequently, when the electrode terminals of the unit cells are electrically connected to the printed circuit board, the positional accuracy between the regions to be connected is high, and therefore, the assembly process is easily accomplished. Furthermore, the coupling force at the connected regions is high in the electrically connected state, and therefore, a risk of short-circuits is considerably reduced even when external forces, such as vibrations and impacts, are applied to the battery module during the use of the battery module. Also, wires are not used to perform the electrical connection, and therefore, the structure of the battery module is simplified. In addition, the sensing board assembly according to the present invention is coupled with the electrode terminals of the unit cells while the sensing board assembly is formed in the shape of a plate, and therefore, it is possible to manufacture a compact battery module.

In accordance with another aspect of the present invention, there is provided a medium- or large-sized secondary battery module including the sensing board assembly as described above.

For example, the battery module may comprise: a plate, on which the plurality of unit cells, which are chargeable and dischargeable secondary cells, are stacked one on another; and circuit units for controlling the operation of the battery.

The plate is not particularly restricted so long as the plate has a structure in which the unit cells can be stacked one on another. The plate may be a case having a receiving part corresponding to the size of the unit cells such that the unit cells can be easily mounted in the receiving part. The case may be constructed in a separated structure in which the upper and lower parts of the stacked unit cells are covered by the case.

In a preferred embodiment of the present invention, the battery module comprises: a plurality of unit cells, which are chargeable and dischargeable secondary cells; a rectangular lower case having a lower receiving part, to which a main board assembly is attached, and an upper receiving part, on which the unit cells are sequentially stacked one on another; a rectangular upper case having a lower receiving part for covering the upper end of the unit cells stacked on the lower case; a first circuit unit for performing the electrical connection between the stacked unit cells, the first circuit unit including a sensing board assembly for sensing the voltage, the current and/or the temperature of the battery; a second circuit unit electrically connected to the first circuit unit, the second circuit unit including a main board assembly for controlling the battery module; and a third circuit unit electrically connected to the second circuit unit, the third circuit unit having switching elements for controlling the operation of the battery when the abnormal operation of the battery, such as overcharge, overdischarge, overcurrent, or overheating, occurs.

The battery module according to the present invention has a compact structure. Specifically, the width of the completed battery module is approximately equal to or slightly greater than that of each unit cell, the length of the battery module is greater by the sum of the width of the first circuit unit, which is attached to one side surface of the battery module, and the width of the third circuit unit, which is attached to the other side surface of the battery module, than that of each unit cell, and the thickness of the battery module approximately is equal to the sum of the total thickness of the stacked unit cells, the thickness of the second circuit unit, and the thicknesses of the upper and lower cases. Consequently, the size of the battery module according to the present invention is less than that of any conventional battery module, and therefore, the battery module according to the present invention can be effectively mounted in external devices or apparatuses, to which the present invention is applied.

The unit cells are not particularly restricted so long as the unit cells are chargeable and dischargeable secondary cells. For example, lithium secondary cells, nickel-metal hydride (Ni-MH) cells, or nickel-cadmium (Ni—Cd) cells may be used as the unit cells. Preferably, the lithium secondary cells are used as the unit cells, since the lithium secondary cells provide a high output to weight ratio. Based on their shapes, the lithium secondary cells are classified into cylindrical cells, rectangular cells, and pouch-shaped cells. Preferably, the rectangular cells and the pouch-shaped cells, which can be stacked in high integration, are used as the unit cells. More preferably, the pouch-shaped cells, the weight of which is small, are used as the unit cells.

According to the present invention, the upper case and the lower case of the battery module are separated from each other. Consequently, when the capacity or the output of the battery module is to be changed as occasion demands, the unit cells are added or removed between the upper case and the lower case, whereby flexible design of the battery module is possible.

As described above, the circuit units, which control the operation of the battery, are connected with each other in such a manner that the circuit units surround the battery module according to the present invention, and therefore, the total size of the battery module is greatly reduced.

The battery module according to the present invention is preferably used in a medium- or large-sized battery system having high output and large capacity. The range of the high output and the large capacity is not particularly restricted.

For example, the battery module according to the present invention may be used as a power source for various applications and products, including a power source for vehicles, such as electric bicycles (e-bikes), electric motorcycles, electric vehicles, or hybrid electric vehicles, and a power source for various applications and products, such as industrial and domestic equipment. More preferably, the battery module according to the present invention is used as a power source for the electric bicycles, since the battery module is constructed in a compact structure.

BRIEF DESCRIPTION OF THE DRAWINGS

The above and other objects, features and other advantages of the present invention will be more clearly understood from the following detailed description taken in conjunction with the accompanying drawings, in which.

Figure 1:
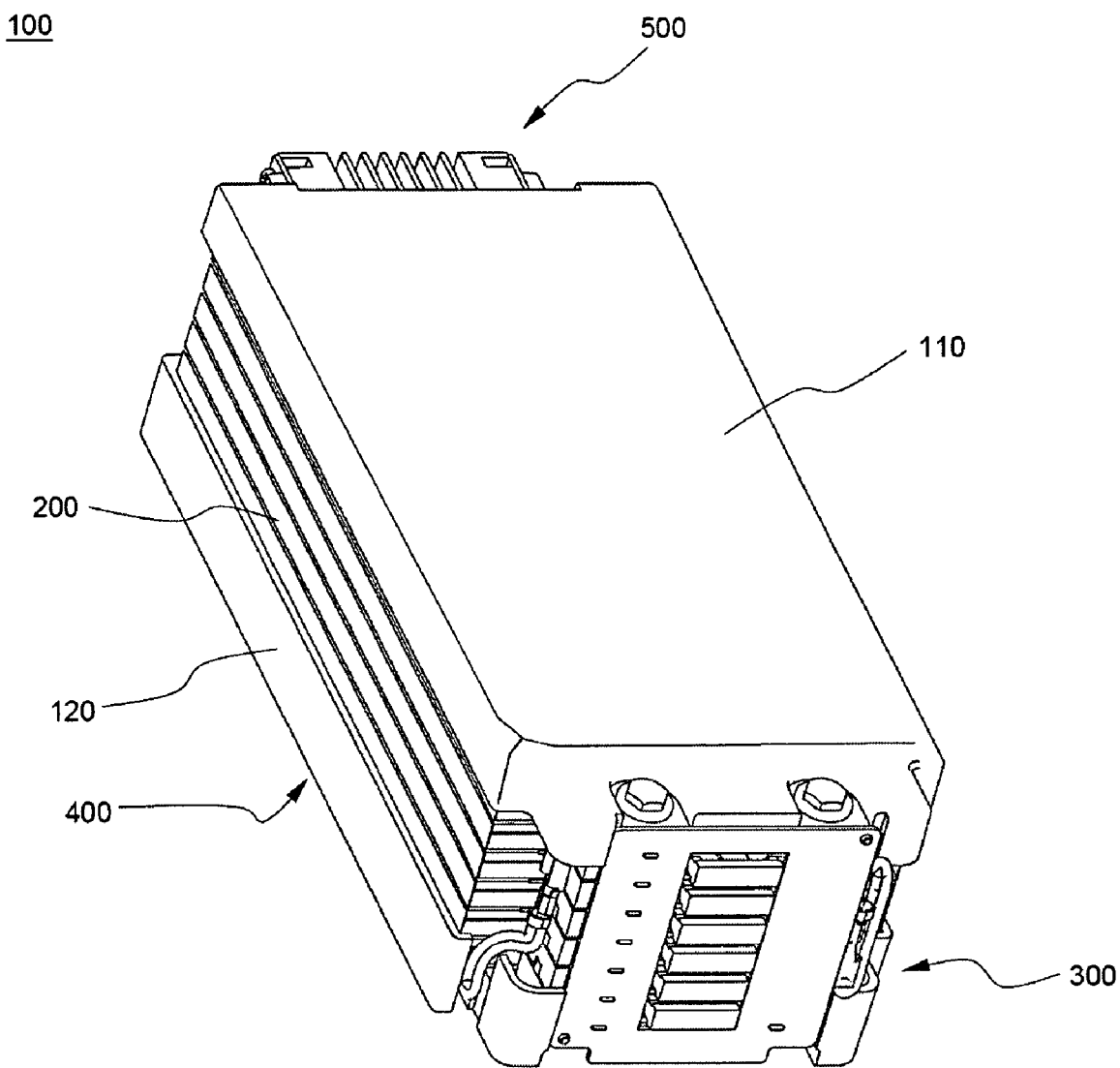
FIG. 1 is a typical perspective view illustrating a battery module according to a preferred embodiment of the present invention.

<Description of Main Reference Numerals of the Drawings>

| | |
|---|---|
| 100: battery module | 200: unit cells |
| 300: first circuit unit | 400: second circuit unit |
| 500: third circuit unit | 600: printed circuit board |
| 700: insulating member | 800: connecting member |
| 900: fuse | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

FIG. 1 is a typical perspective view illustrating a battery module 100 according to a preferred embodiment of the present invention.

Referring to FIG. 1, the battery module 100 includes an upper case 110, a lower case 120, a plurality of unit cells 200, a first circuit unit 300, a second circuit unit 400, and a third circuit unit 500. The unit cells 200 are stacked between the upper case 110 and the lower case 120, which are separated from each other. The first circuit unit 300 is mounted at the front surface of the battery module 100, the second circuit unit 400 is mounted at the lower surface of the battery module 100, and the third circuit unit 500 is mounted at the rear surface of the battery module 100.

Since the upper case 110 and the lower case 120 are separated from each other, the number of the unit cells 200, which are stackable one on another, is not limited by the upper case 110 and the lower case 120. Consequently, it is possible to easily design the battery module 100, such that the battery module 100 has desired electrical capacity and output, by modifying the first circuit unit 300 and the third circuit unit 500 depending upon the number of the stacked unit cells 200. Also, the unit cells 200 are exposed, and therefore, heat dissipation is efficiently accomplished while the unit cells 200 are charged or discharged.

The first circuit unit 300 is mounted at the battery module 100 adjacent to electrode terminals of the unit cells 200. The first circuit unit 300 includes a sensing board assembly for connecting the unit cells 200 in parallel or in series with each other and for sensing the voltage of the respective unit cells 200 according to the present invention.

The unit cells 200 are electrically connected to the second circuit unit 400, which is mounted at the lower end of the lower case 120, via the first circuit unit 300. The operation of the battery module is controlled by a main board assembly of the second circuit unit 400.

The third circuit unit 500, which is electrically connected to the second circuit unit 400, is mounted at the battery module 100 such that the third circuit unit 500 is opposite to the first circuit unit 300. The third circuit unit 500 is the last element of the battery module 100, which controls overcharge, overdischarge, and overcurrent of the battery, and is connected to an external device (not shown). The overcharge, overdischarge, and overcurrent of the battery may be controlled by switching elements (not shown), such as field effect transistor (FET) elements, included in the third circuit unit 500.

Figure 2:
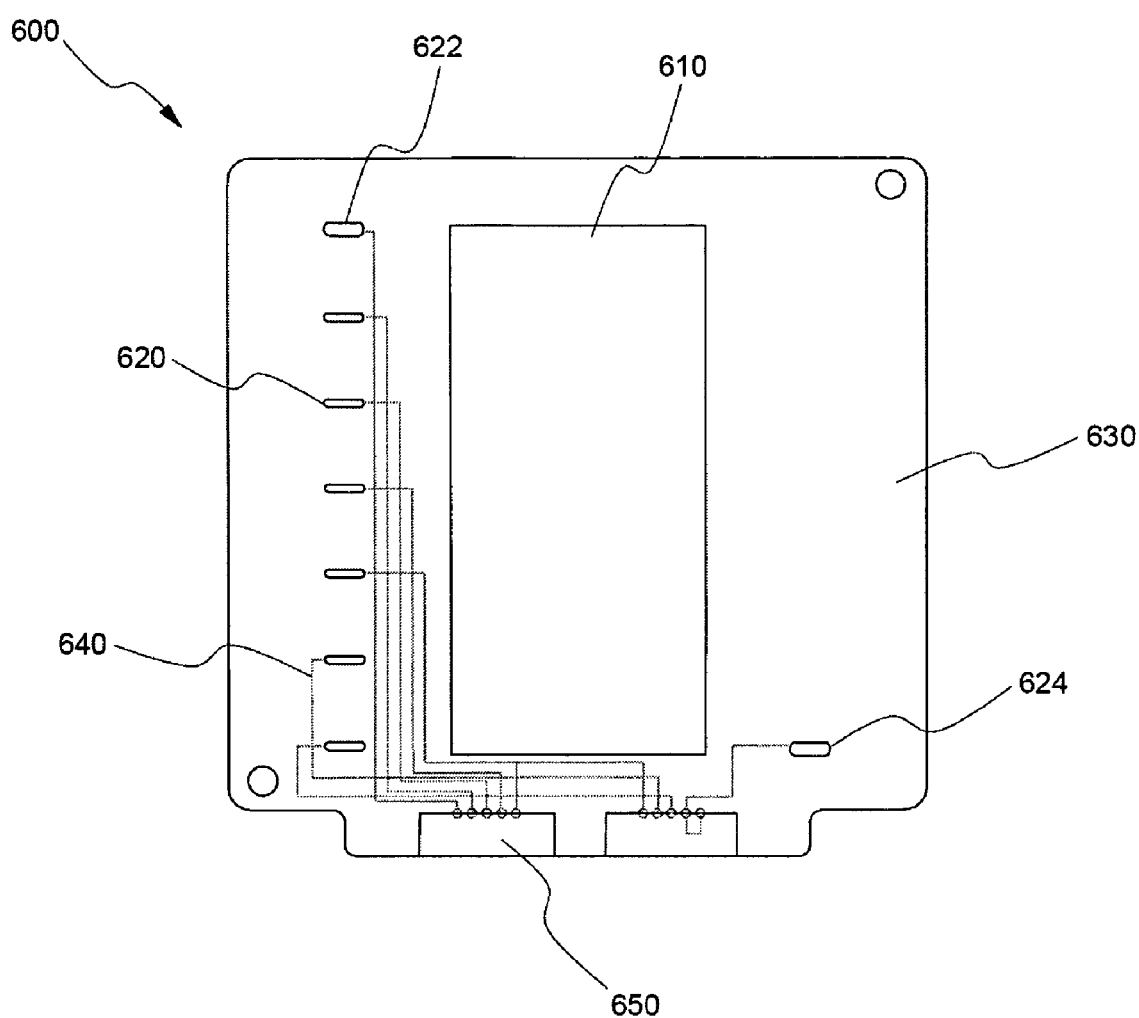
FIG. 2 is a front view illustrating a printed circuit board of a sensing board assembly according to a preferred embodiment of the present invention, to which a connecting member is not connected.

FIG. 2 is a front view illustrating a printed circuit board 600 of a sensing board assembly according to a preferred embodiment of the present invention, to which a connecting member is not connected.

Referring to FIG. 2, the printed circuit board 600 is a rectangular plate-shaped member. A wide opening 610 is formed at the center of the printed circuit board 600, and a plurality of drilled-holes 620 are formed at the printed circuit board 600 at one side of the wide opening 610. To the respective drilled-holes 620 are connected circuits 640, which are printed on a board body 630 of the printed circuit board 600. The circuits 640 are connected to sockets 650, which are formed at one end of the board body 630. The number of the sockets 650 may be decided depending upon the number of the circuits 640 connected to the sockets 650. At the left upper end and the right lower end of the board body 630 are formed relatively large drilled-holes 622 and 624, respectively, to which final cathode and anode terminals are connected when unit cells (not shown) are connected in series with each other. Specifically, final cathode and anode wires, which are used for the electrical connection between the unit cells connected in series with each other, are connected to the drilled-holes 622 and 624.

The opening 610 is provided to expose the connected regions of the electrode terminals of the unit cells, which are located opposite to the board body 630. While the printed circuit board 600 is mounted, a safety element, such as a fuse, a bimetal, or a positive temperature coefficient (PTC) element, may be mounted at the electrode terminals through the opening 610.

Figure 3:
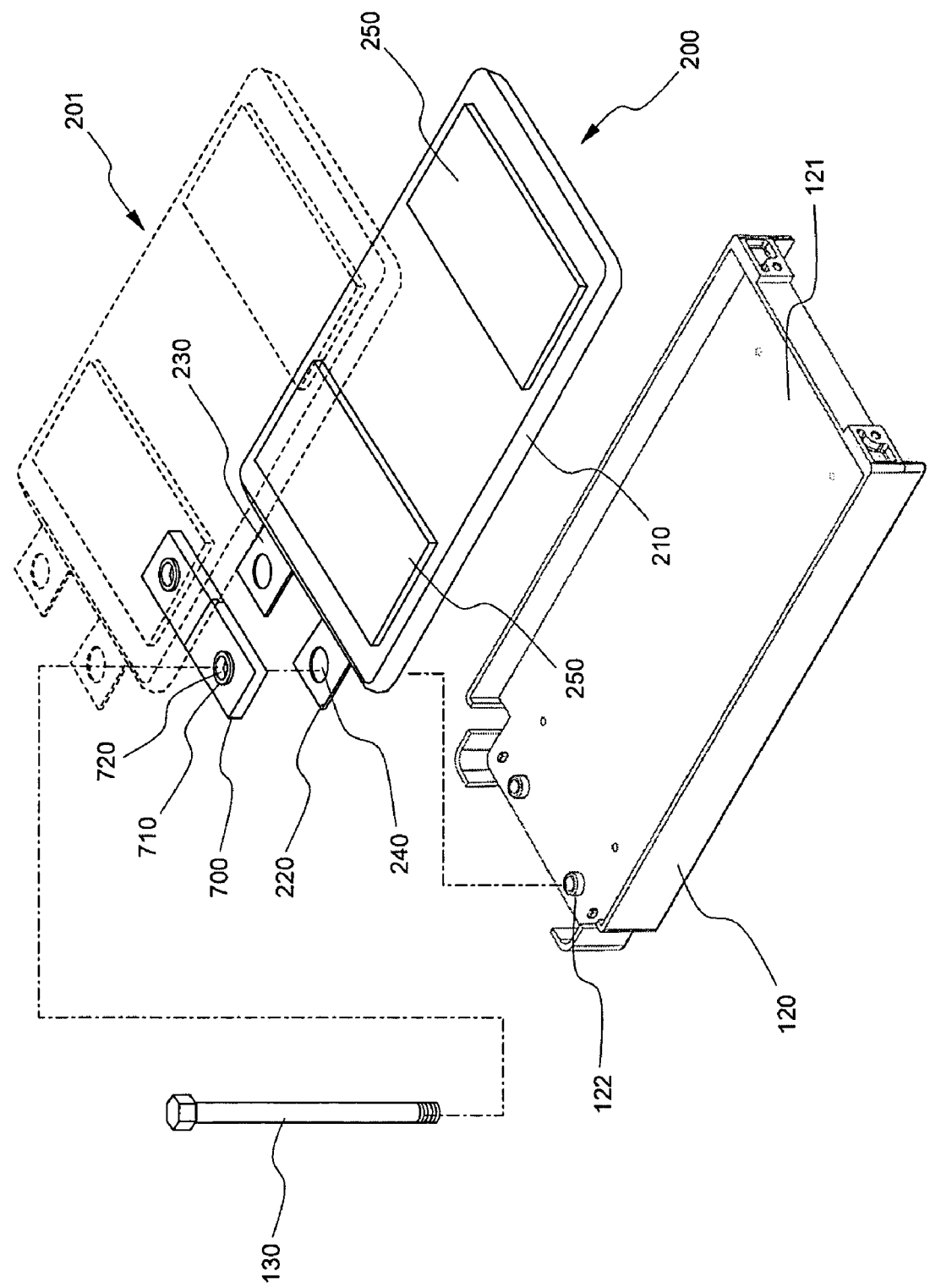
FIG. 3 is a typical view illustrating mounting of unit cells on a lower case of the battery module shown in FIG. 1.

FIG. 3 is a typical view illustrating mounting of the unit cells on the lower case of the battery module shown in FIG. 1.

Referring to FIG. 3, the lower case 120 is a structure having a size almost corresponding to the outer appearance of the unit cell 200. The lower case 120 includes an upper receiving part 121, in which the unit cell 200 is received. Preferably, the lower case 120 is made of a plastic resin, such as acrylonitrile-butadiene-styrene (ABS), polycarbonate (PC), or polybutylene terephthalate (PBT), which has high strength and electrical insulation.

The unit cell 200 stacked on the lower case 120 is a pouch-shaped secondary cell, which has a cathode terminal 220 and an anode terminal 230 protruding from the upper end of a cell body 210. At the electrode terminals 220 and 230 are formed though-holes 240, respectively. Additional fixing members, for example, fasteners 130, are inserted through the through-holes 240 and fixing holes 122 formed in the lower case 120, while the unit cells 200 and 201 are stacked, and then nuts (not shown) are fitted on the fasteners 130 at the lower surface of the lower case 120. Consequently, the unit cells 200 and 201 are fixed to each other.

Between the electrode terminals 220 and 230 of the unit cells 200 and the electrode terminals 220 and 230 of the unit cells 201 are mounted an insulating member 700 for accomplishing the electrical insulation between the unit cells 200 and 201. At the insulating member 700 are formed protrusions 710, which are fitted in the though-holes 240 of the electrode terminals 220 and 230. At the protrusions 710 are also formed through-holes 720, and therefore, the electrical insulation between the fasteners 130 inserted through the through-holes 720 of the protrusions 710 and the electrode terminals 220 and 230 is maintained.

Also, two double-sided adhesive tapes 250 are attached to the cell body 210 of the unit cell 200, whereby more stable coupling between the stacked unit cells 200 and 201 is guaranteed. Furthermore, the stacked unit cells 200 and 201 are spaced apart from each other by the thickness of the double-sided adhesive tapes 250. The gap between the stacked unit cells 200 and 201 serves to absorb the change in volume of the unit cells 200 and 201, while the unit cells 200 and 201 are charged or discharged, and to effectively dissipate heat generated from the unit cells 200 and 201 while the unit cells 200 and 201 are charged or discharged.

Figure 4:
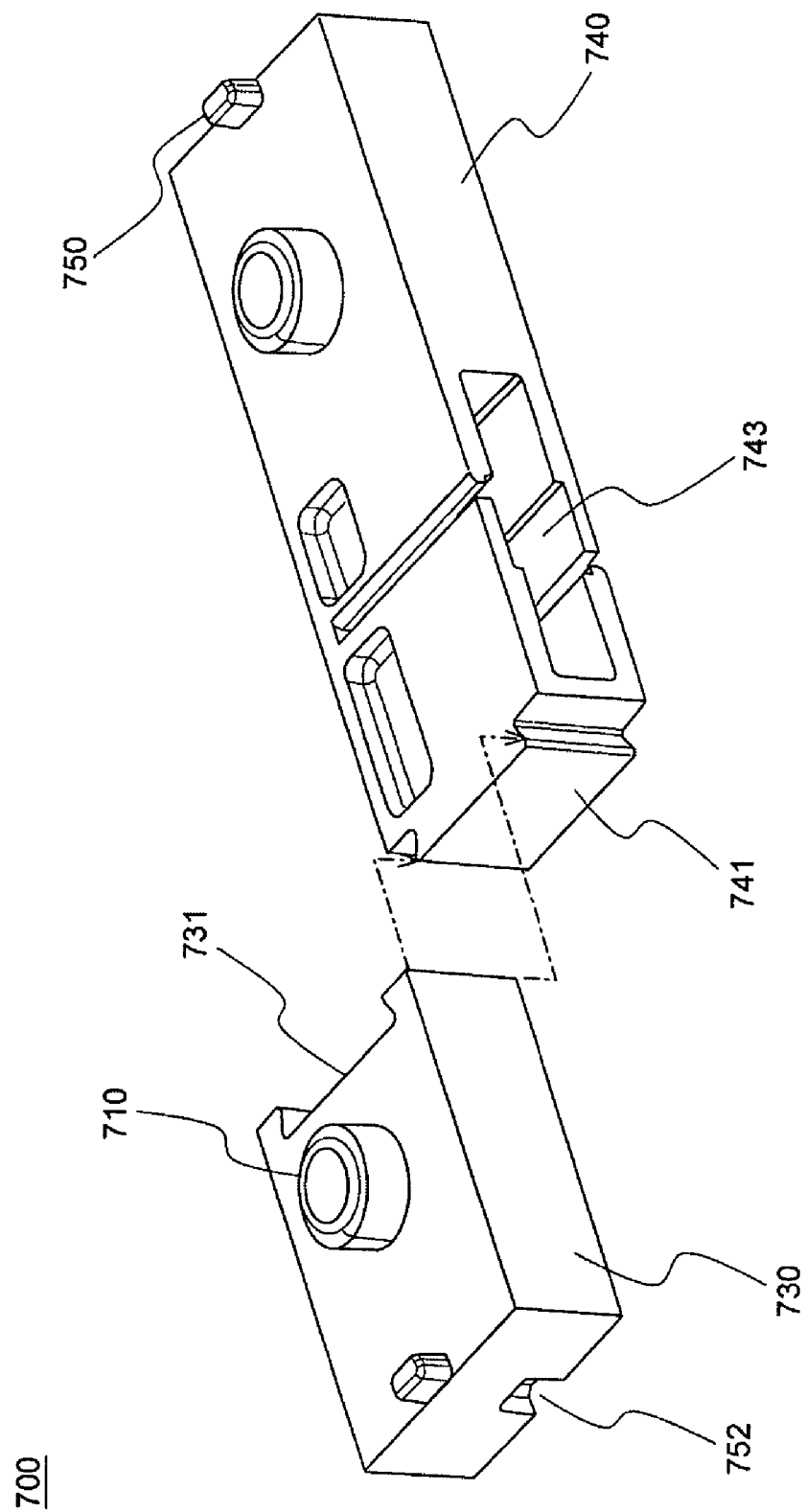
FIG. 4 is a typical view illustrating an assembly-type insulating member according to a preferred embodiment of the present invention, which can be used in the battery module according to the present invention, before assembly of the insulating member.

FIG. 4 is a typical view illustrating an assembly-type insulating member 700 according to a preferred embodiment of the present invention, which can be used in the battery module according to the present invention, before assembly of the insulating member.

Referring to FIG. 4, the insulating member 700 comprises: a first assembly unit body 730 having a female coupling part 731 formed at one side thereof; and a second assembly unit body 740 having a male coupling part 741 formed at one side thereof such that the male coupling part 741 corresponds to the female coupling part 731. The first assembly unit body 730 and the second assembly unit body 740 can be coupled with or separated from each other. The insulating member 700 is constructed approximately in the shape of a rectangular block when the first assembly unit body 730 and the second assembly unit body 740 are coupled with each other.

At the outside parts of the upper ends of the respective assembly unit bodies 730 and 740 are formed coupling protrusions 750, by which the assembly unit bodies 730 and 740 are coupled with another insulating member (not shown) stacked on the assembly unit bodies 730 and 740. At the lower end surfaces of the assembly unit bodies 730 and 740 are formed coupling grooves 752, which correspond to the coupling protrusions 750. Also, the protrusions 710 are formed at the middle parts of the upper ends of the respective assembly unit bodies 730 and 740 such that the protrusions 710 are fitted in the though-holes (not shown) of the electrode terminals of the unit cell, as shown in FIG. 3.

At the side of the second assembly unit body 740 is formed a hollow part 743, by which a connecting member (not shown) is coupled with the insulating member 700 constructed by coupling the first assembly unit body 730 and the second assembly unit body 740.

Figure 5:
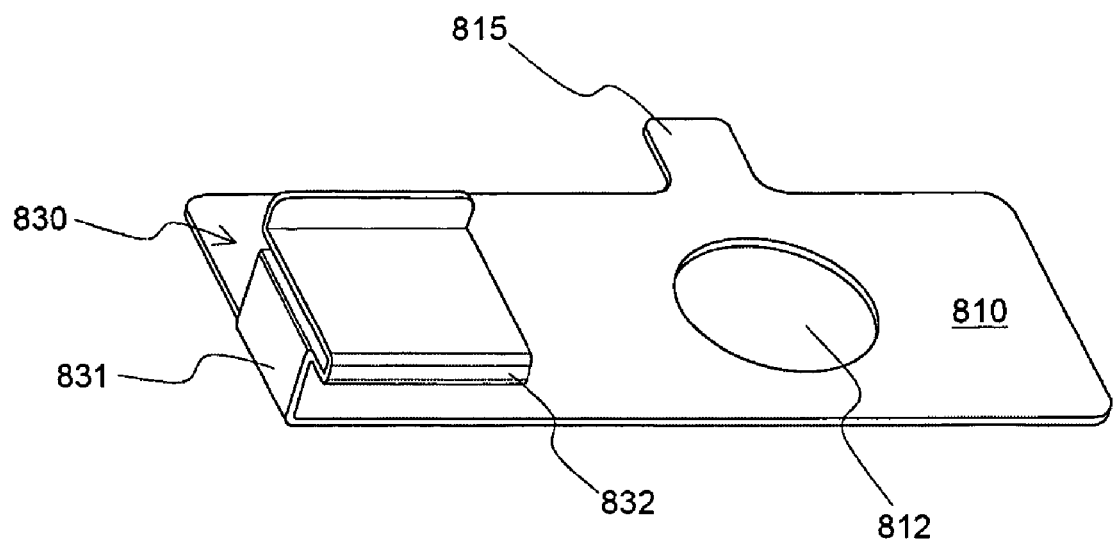
FIG. 5 is a typical view illustrating a separation-type connecting member according to a preferred embodiment of the present invention, which can be used in the sensing board assembly according to the present invention.
Figure 5:
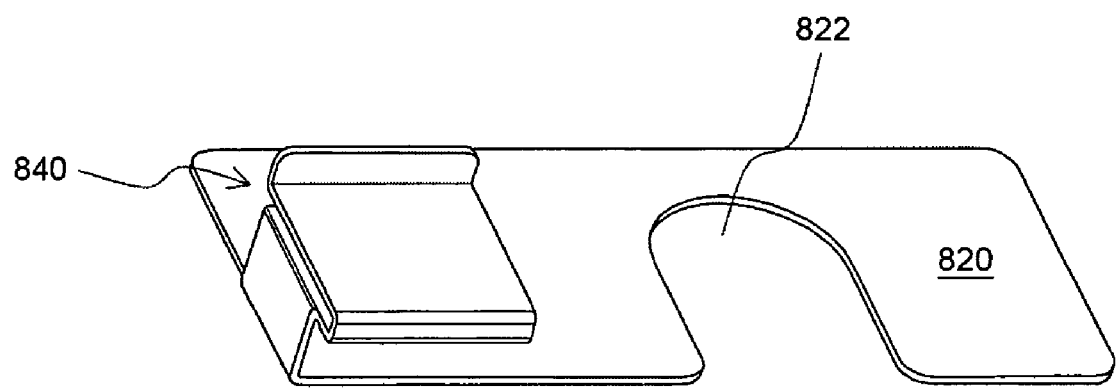

FIG. 5 is a typical view illustrating a separation-type connecting member 800 according to a preferred embodiment of the present invention, which can be used in the sensing board assembly according to the present invention.

Referring to FIG. 5, the separation-type connecting member 800 comprises: a first terminal connecting body 810, which is connected to one of the electrode terminals of the unit cell (for example, the cathode terminal); and a second terminal connecting body 820, which is connected to the other electrode terminal of the unit cell (for example, the anode terminal). The terminal connecting bodies 810 and 820 are made of a conductive material and formed in the shape of a plate. At the respective terminal connecting bodies 810 and 820 are formed engaging grooves 812 and 822, in which the protrusions 710 of the insulating member (see FIG. 4) are fitted. The engaging groove 812 formed at the first terminal connecting body 810 is constructed in a closed type such that the corresponding protrusion of the insulating member is fitted into the engaging groove 812 of the first terminal connecting body 810 only from above. On the other hand, the engaging groove 822 formed at the second terminal connecting body 820 is constructed in an open type such that the corresponding protrusion of the insulating member is fitted into the engaging groove 822 of the second terminal connecting body 810 from both above and side. A process of assembling the insulating member and the connecting member will be described hereinafter with reference to FIG. 6.

At the first terminal connecting body 810 is formed a connecting extension part 815, which protrudes from the side thereof such that the connecting extension part 815 can be connected to the printed circuit board 600 (see FIG. 2) in the assembled state.

At the respective terminal connecting bodies 810 and 820 are formed engaging parts 830 and 840, respectively, which are securely inserted into the hollow part 743 of the insulating member (see FIG. 4). Each of the engaging parts 830 and 840 includes a first bent section 831 formed by bending inwardly a main body, which is made of a plate-shaped material, at a predetermined height and a second bent section 832 formed by vertically bending the first bent section 831. Consequently, the engaging parts 830 and 840 can be elastically engaged in the hollow part of the insulating member.

Figure 6:
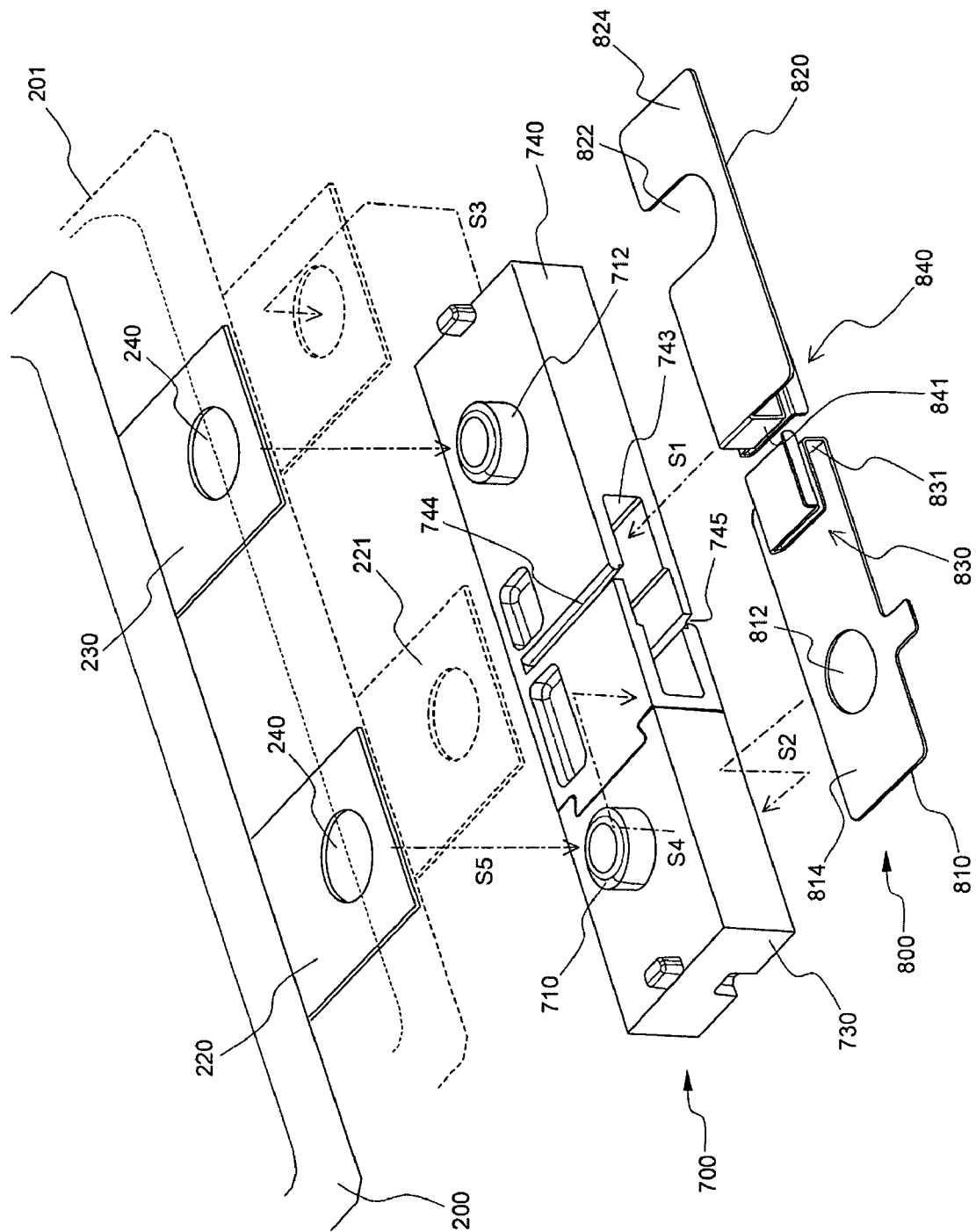
FIG. 6 is a typical view partially illustrating the connection of electrode terminals of the unit cells using the assembly-type insulating member shown in FIG. 4 and the separation-type connecting member shown in FIG. 5.

FIG. 6 is a typical view partially illustrating the connection of electrode terminals of the unit cells using the assembly-type insulating member shown in FIG. 4 and the separation-type connecting member shown in FIG. 5. Specifically, the connection of the unit cells 200 and 201 in series using the insulating member 700 and the connecting member 800 is illustrated in FIG. 6.

Referring to FIG. 6, the engaging parts 830 and 840 of the first and second terminal connecting bodies 810 and 820 of the connecting member are securely inserted into the hollow part 743 of the second assembly unit body 740 of the insulating member. Specifically, the engaging part 830 of the first terminal connecting body 810 is inserted into the hollow part 743 with the engaging part 830 upward, and the plate-shaped main body 814 covers the lower end surfaces of the first assembly unit body 730 and the second assembly unit body 740. When the first terminal connecting body 810 is coupled to the insulating member as described above, the side bent section 831 of the engaging part 830 is moved inward along a lower guide groove 745 formed a predetermined length at the lower end of the hollow part 743. When the engaging part 830 of the first terminal connecting body 810 is inserted into the hollow part 743 of the insulating member 700, the first terminal connecting body 810 is mounted at the lower end surface of another insulating member (not shown) having no projections. For this reason, the engaging groove 812 is formed in the closed type.

On the other hand, the engaging part 840 of the second terminal connecting body 820 is inserted into the hollow part 743 with the engaging part 840 downward, and the plate-shaped main body 824 covers the upper end surface of the second assembly unit body 740. When the second terminal connecting body 820 is coupled to the insulating member as described above, the side bent section 841 of the engaging part 840 is moved inward along an upper guide groove 744 formed a predetermined length at the upper end of the hollow part 743. When the engaging part 840 of the second terminal connecting body 820 is inserted into the hollow part 743 of the insulating member 700, the second terminal connecting body 820 is mounted at the upper end surface of the insulating member 700 having the protrusions 712. For this reason, the engaging groove 822 is formed in the open type.

The two terminal connecting bodies 810 and 820 remain separated from each other as shown in the drawing (showing the state before the coupling) even after the terminal connecting bodies 810 and 820 are coupled to the insulating member 700. The first terminal connecting body 810 is connected to a cathode terminal 221 of the unit cell 201 coupled to the lower end surface of the first assembly unit body 730, and the second terminal connecting body 820 is connected to an anode terminal 230 of the unit cell 200 coupled to the protrusion 712 of the second assembly unit body 740.

Now, the process of assembling the insulating member and the connecting member will be described.

First, the second terminal connecting body 820 is coupled to the second assembly unit body 740 (S1). Next, the first terminal connecting body 810 is coupled to the second assembly unit body 740 (S2). Subsequently, the engaging groove 822 of the second terminal connecting body 820 coupled to the second assembly unit body 740 as described above is aligned with the through-hole 240 of the anode terminal 230 of the unit cell 200 (S3). After that, the first assembly unit body 730 is coupled to the second assembly unit body 740 (S4). Finally, the unit cell 200 is mounted at the insulating member 700 such that the protrusion 710 is fitted in the though-hole 240 of the cathode terminal 220, and the protrusion 712 is fitted in the through-hole 240 of the anode terminal 230 (S5). At this time, the cathode terminal 220 is brought into contact with another first terminal connecting body (not shown) to be coupled from above while the cathode terminal 220 is coupled to the protrusion 710. On the other hand, the anode terminal 230 is brought into contact with the second terminal connecting body 820, which is coupled to the protrusion 712.

The above-described assembly process is merely an example of a possible assembly process, and the sequence of the assembly process may be partially changed. For example, the step of coupling the first assembly unit body 730 and the second assembly unit body 740 (S4) may be carried out first.

Figure 7:
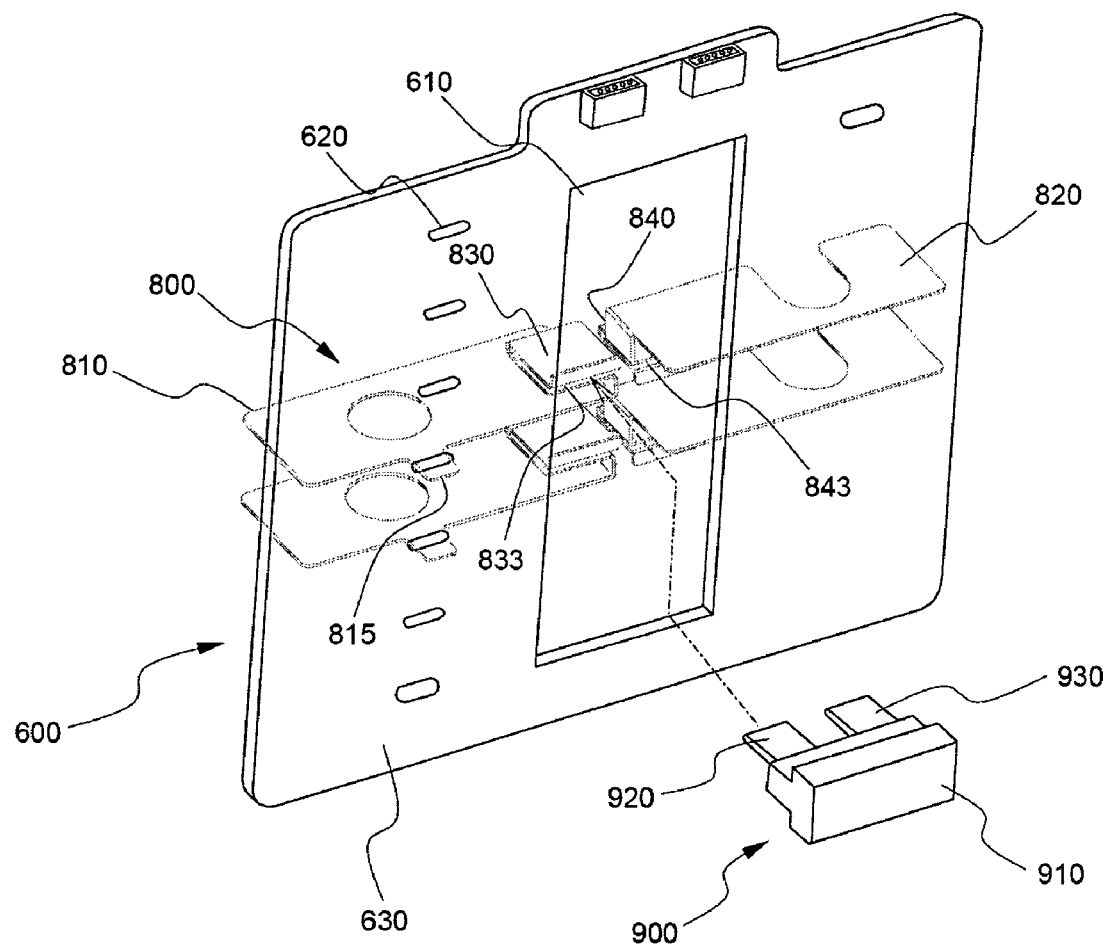
FIG. 7 is a typical view illustrating the connection of the printed circuit board shown in FIG. 2 after the connection of the electrode terminals of the unit cells is completed as shown in FIG. 6.

FIG. 7 is a typical view illustrating the connection of the printed circuit board shown in FIG. 2 after the connection of the electrode terminals of the unit cells is completed as shown in FIG. 6. For the convenience of understanding, only connecting members, by which the electrode terminals of the unit cells are connected with each other, are partially indicated with an imaginary line.

While the connecting members are coupled to the corresponding insulating members, the connecting extension parts 815 of the first terminal connecting bodies 810 are oriented toward the printed circuit board 600. Since the first terminal connecting bodies 810 are stably fixed at the positions corresponding to the electrode terminals of the unit cells, the connecting extension parts 815 are also located at their predetermined positions. Consequently, the printed circuit board 600 is placed on the connecting members 800 such that the connecting extension parts 815 can be inserted through the drilled-holes 620 of the printed circuit board 600, which is the first step of the assembly process. After the first step of the assembly process is completed, the tips of the connecting extension parts 815 protrude from the board body 630 through the drilled-holes 620. The protruding tips of the connecting extension parts 815 are soldered to accomplish the electrical connection and the physical coupling between the connecting members 800 and the printed circuit board 600.

Even after the coupling between the connecting members 800 and the printed circuit board 600 is accomplished, the terminal connecting bodies 810 and 820 remain separated from each other, and therefore, the terminal connecting bodies 810 and 820 are not electrically connected with each other. Consequently, after the assembly of the relevant members is completed, it is necessary to connect the terminal connecting bodies 810 and 820 with a safety element or an additional conductive element such that the electrical conduction between the terminal connecting bodies 810 and 820 is accomplished. FIG. 7 illustrates the electrical connection using a fuse 900, which is a kind of safety element.

The fuse 900 includes a fuse body 910 having a region that may break when overcurrent or overheating occurs and two connecting terminals 920 and 930 extending from the fuse body 910.

Elastic connecting grooves 833 and 843 are formed at the engaging parts 830 and 840 of the first and second terminal connecting bodies 810 and 820 while the first terminal connecting body 810 and the second terminal connecting body 820 are coupled to the insulating member 700. The connecting terminals 920 and 930 of the fuse 900 are inserted into the connecting grooves 833 and 843 of the engaging parts 830 and 840, whereby the electrical connection between the first terminal connecting body 810 and the second terminal connecting body 820 is accomplished. When overcurrent or overheating occurs at the corresponding unit cell (not shown), the fuse 900 is broken. In this case, the broken fuse 900 is removed without disassembling the battery module, and a new fuse is coupled to first terminal connecting body 810 and the second terminal connecting body 820.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the connecting extension parts of the connecting members, which have a higher strength than the electrode terminals of the unit cells, are connected to the printed circuit board of the sensing board assembly according to the present invention. Consequently, when the electrode terminals of the unit cells are electrically connected to the printed circuit board, the positional accuracy between the regions to be connected is high, and therefore, the assembly process is easily accomplished. Furthermore, the coupling force at the connected regions is high in the electrically connected state, and therefore, a risk of short-circuits is considerably reduced even when external forces, such as vibrations and impacts, are applied to the battery module during the use of the battery module. Also, wires are not used to perform the electrical connection, and therefore, the structure of the battery module is simplified. In addition, the sensing board assembly according to the present invention is coupled with the electrode terminals of the unit cells while the sensing board assembly is formed in the shape of a plate, and therefore, it is possible to manufacture a compact battery module.

Consequently, the battery module according to the present invention can be variously utilized as a battery module for medium- or large-sized devices, such as electric bicycles, electric vehicles, and hybrid electric vehicles.

What is claimed is:

1. A medium- or large-sized secondary battery module which has a plurality of secondary unit cells mounted therein, comprising:
   a plurality of unit cells, which are chargeable and dischargeable secondary cells;
   a rectangular lower case having a lower receiving part, to which a main board assembly is attached, and an upper receiving part, on which the unit cells are sequentially stacked one on another;
   a rectangular upper case having a lower receiving part for covering an upper end of the unit cells stacked on the lower case;
   a first circuit unit for performing the electrical connection between the stacked unit cells, the first circuit unit including a sensing board assembly for sensing a voltage, a current and/or a temperature of the unit cells;
   a second circuit unit electrically connected to the first circuit unit, the second circuit unit including a main board assembly for controlling the battery module; and
   a third circuit unit electrically connected to the second circuit unit, the third circuit unit having switching elements for controlling the operation of the battery module when the abnormal operation of the battery module, such as overcharge, overdischarge, overcurrent, or overheating, occurs;
   wherein a sensing board assembly comprises: connecting members for electrically connecting electrode terminals of the unit cells with each other, each of the connecting members including a connecting extension part, by which the connecting members are connected to a printed circuit board; and the printed circuit board having drilled-holes, through which the connecting extension parts of the connecting members are securely inserted, and circuits connected to the drilled-holes.

2. The battery module as set forth in claim 1, wherein the connecting extension parts of the connecting members have a length sufficient to protrude outward from the printed circuit board after the connecting extension parts are inserted through the drilled-holes, and the protruding tips of the connecting extension parts are coupled to the printed circuit board by soldering.

3. The battery module as set forth in claim 1, wherein the voltage of the unit cells are sensed by the sensing board assembly.

4. The battery module as set forth in claim 1, wherein the sensing board assembly further comprises:
   insulating members mounted between the electrode terminals of the neighboring unit cells for accomplishing the electrical insulation between the electrode terminals, the insulating members being coupled to the electrode terminals, wherein
   the electrical connection between the electrode terminals of the unit cells is accomplished by the connecting members while the connecting members are coupled to the corresponding insulating members.

5. The battery module as set forth in claim 4, wherein each of the insulating members comprises:
   two assembly unit bodies constructed such that the assembly unit bodies can be coupled with or separated from each other, a cathode terminal of the unit cell being coupled to one of the assembly unit bodies while an anode terminal of the unit cell is coupled to the other assembly unit body.

6. The battery module as set forth in claim 1,
   wherein each of the connecting members comprises:
   a first terminal connecting body connected to an electrode terminal (a) of one unit cell (A); and
   a second terminal connecting body connected to an electrode terminal (b) of another unit cell (B) adjacent to the unit cell (A), and
   wherein the connecting members are coupled to the corresponding insulating members in such a manner that the connecting members surround the corresponding insulating members, or the connecting members are inserted into engaging grooves formed at the insulating members.

7. The battery module as set forth in claim 6, wherein
   the first terminal connecting body and the second terminal connecting body are separated from each other,
   the first terminal connecting body and the second terminal connecting body are coupled to the corresponding insulating member such that the first and second terminal connecting bodies are connected to the corresponding electrode terminals, and
   the first terminal connecting body and the second terminal connecting body are connected with each other by a conductive member for accomplishing the electrical connection between the first terminal connecting body and the second terminal connecting body after the first and second terminal connecting bodies are coupled to the corresponding insulating member.

8. The battery module as set forth in claim 1, wherein the printed circuit board is provided at the center thereof with a wide opening, through which the connecting members are partially exposed while the printed circuit board is coupled to the connecting members.

* * * * *

UNITED STATES PATENT AND TRADEMARK OFFICE
CERTIFICATE OF CORRECTION

PATENT NO. : 7,609,028 B2
APPLICATION NO. : 11/317309
DATED : October 27, 2009
INVENTOR(S) : Ha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Twelfth Day of October, 2010

David J. Kappos
*Director of the United States Patent and Trademark Office*